United States Patent
Ikushima

(10) Patent No.: US 7,527,768 B2
(45) Date of Patent: May 5, 2009

(54) LIQUID DISPENSER WITH VACUUM CONTROL

(75) Inventor: Kazumasa Ikushima, Tokyo (JP)

(73) Assignee: Musashi Engineering Inc., Tokyo (JP)

( * ) Notice: Subject to any disclaimer, the term of this patent is extended or adjusted under 35 U.S.C. 154(b) by 0 days.

(21) Appl. No.: 11/574,183

(22) PCT Filed: Aug. 26, 2005

(86) PCT No.: PCT/JP2005/016073

§ 371 (c)(1),
(2), (4) Date: Feb. 23, 2007

(87) PCT Pub. No.: WO2006/022458

PCT Pub. Date: Mar. 2, 2006

(65) Prior Publication Data

US 2007/0227227 A1  Oct. 4, 2007

(30) Foreign Application Priority Data

Aug. 26, 2004 (JP) ............................. 2004-247248

(51) Int. Cl.
*B01L 3/02* (2006.01)
*G01N 1/14* (2006.01)
*B67D 5/54* (2006.01)

(52) U.S. Cl. .................. 422/100; 422/99; 73/864.01; 73/864.11; 73/864.15; 222/53

(58) Field of Classification Search .................... 73/864, 73/864.01, 864.11, 864.15, 864.87; 422/99, 422/100; 604/97.02, 99.02; 222/53

See application file for complete search history.

(56) References Cited

U.S. PATENT DOCUMENTS

| 3,561,503 A | * | 2/1971 | Rogge | ........................ 141/7 |
| 4,976,546 A | * | 12/1990 | Beattie | .................... 366/162.3 |
| 4,989,756 A |   | 2/1991 | Kagamihara et al. | |

(Continued)

FOREIGN PATENT DOCUMENTS

EP  467864 A2 * 1/1992

(Continued)

OTHER PUBLICATIONS

English Language Abstract of JP 2004-105968.

(Continued)

*Primary Examiner*—David A. Rogers
(74) *Attorney, Agent, or Firm*—Greenblum & Bernstein, P.L.C.

(57) ABSTRACT

A liquid dispenser is provided which dispenses a predetermined amount of a liquid from a reservoir. It includes a negative pressure system to supply a negative pressure which acts on the liquid in the liquid reservoir while no liquid is being dispensed. The negative pressure system includes a negative pressure source, an electropneumatic regulator communicating with the negative pressure source to regulate the pressure inside the liquid reservoir to a desired negative pressure level, a pressure sensor provided between the electropneumatic regulator and reservoir, and a control means for controlling the electropneumatic regulator responsive to a signal from the pressure sensor to regulate the pressure inside the reservoir to the desired negative pressure level. It can assure a negative pressure which is stable even just after it is switched on and can thus work stably even right after the switch-on.

5 Claims, 1 Drawing Sheet

U.S. PATENT DOCUMENTS

| | | | |
|---|---|---|---|
| 5,199,607 A | 4/1993 | Shimano | |
| 5,277,333 A | 1/1994 | Shimano | |
| 6,742,993 B2 * | 6/2004 | Savard et al. | 417/53 |

FOREIGN PATENT DOCUMENTS

| | | | |
|---|---|---|---|
| JP | 2-056271 A | | 2/1990 |
| JP | 2-122858 | | 5/1990 |
| JP | 3-217271 | | 9/1991 |
| JP | 6-204268 | | 7/1994 |
| JP | 6-296916 A | | 10/1994 |
| JP | 7-050418 | | 5/1995 |
| JP | 10252942 A | * | 9/1998 |
| JP | 11347395 | * | 12/1999 |
| JP | 2003241841 A | * | 8/2003 |
| JP | 2004-105968 | | 4/2004 |
| RU | 2240963 C2 | * | 11/2004 |

OTHER PUBLICATIONS

English Language Abstract of JP 2-122858.
English Language Abstract of JP 6-204268.
English Language Abstract of Corresponding JP 63-020605.
English Language Abstract of JP 3-217271.
English language Abstract of JP 6-296916 A (Oct. 36, 1994).
English language Abstract of JP 2-056271 A (Feb. 26, 1990).

* cited by examiner

LIQUID DISPENSER WITH VACUUM CONTROL

FIELD OF THE INVENTION

The present invention generally relates to a dispenser capable of dispensing a paste- or cream-state electronic material, adhesive and other middle- or high-viscosity liquid material, liquid material varying in viscosity with time, low-viscosity liquid material or the like accurately from a syringe, and more particularly, to a liquid dispenser capable of a high-accuracy dispensing even right after it is turned on.

BACKGROUND ART

One of the liquid dispensers of the above type is known from, for example, the Japanese Unexamined Patent Publication No. 217271 of 1990.

The above Unexamined Japanese Patent Publication discloses a liquid dispenser having connected thereto a syringe and an air source and air aspirator via a dispensing solenoid valve and which includes an accumulator and pressure-regulation reducing valve provided in this order between the dispensing solenoid valve and air source upstream of the solenoid valve, an accumulator and suctorial-negative pressure reducing valve provided in this order between the dispensing solenoid valve and air aspirator upstream of the solenoid valve, and a controller that supplies a dispense command to the dispensing solenoid valve for a predetermined time while supplying a pressure setting signal corresponding to at least the residual amount of a liquid in the syringe to each of the pressure-regulation reducing valve and suctorial-negative pressure reducing valve. An embodiment of this liquid dispenser in which each of the pressure-regulation reducing valve and suctorial-negative pressure reducing valve uses an electropneumatic regulator is disclosed along with its circuit diagram in the above Japanese Unexamined Patent Publication.

As stated in the Japanese Examined Patent Publication No. 50418 of 1994, the above "electropneumatic regulator" is adapted to detect, when regulating delivery pressure, the pressure by means of a pressure sensor included therein, compare the detected pressure with a set pressure level, supply a pneumatic pulse to a pilot chamber by controlling a solenoid valve included therein correspondingly to the result of the comparison, open or close an inlet or outlet valve connected to the pilot chamber and thus regulate the delivery pressure from a main valve to the set pressure level. The electropneumatic regulator per se is well known.

It should be noted however that in such a conventional technology, the negative pressure in the syringe just after the liquid dispenser is switched on was found to vary more largely than that in the syringe after a while from the switch-on.

Namely, the negative pressure applied to act on a liquid in the syringe in order to prevent dripping is not sufficiently stable just after the apparatus is turned on, so that in case the negative pressure is insufficient, the liquid will drip from the end of a nozzle communicating with the syringe and having an outlet formed in the tip thereof, while in case the negative pressure is excessive, atmosphere will be sucked into the apparatus through the nozzle end.

DISCLOSURE OF THE INVENTION

It is an object of the present invention to overcome the above-mentioned drawbacks of the related art by providing a liquid dispenser which can assure a negative pressure stable even just after the apparatus is switched on and can thus work stably even just after the switch-on.

The inventors of the present invention have devoted themselves to research and development for overcoming the drawbacks and worked out an invention which will be discussed below:

According to an embodiment of the present invention, there is provided a liquid dispenser for dispensing a predetermined amount of a liquid from a reservoir, including a negative pressure system to supply a negative pressure which acts on the liquid in the liquid reservoir while no liquid is being dispensed, the negative pressure system including a negative pressure source, an electropneumatic regulator communicating with the negative pressure source to regulate the pressure inside the liquid reservoir to a desired negative pressure level, a pressure sensor provided between the electropneumatic regulator and reservoir, and a control means for controlling the electropneumatic regulator responsive to a signal from the pressure sensor to regulate the pressure inside the reservoir to the desired negative pressure level.

Since the above liquid dispenser as the embodiment of the present invention is capable of stable liquid dispensing and application even just after the apparatus is turned on, the apparatus may not be warmed up prior to use. Also, since the liquid dispenser can get started quickly, it is possible to make a job efficiently without any standby time.

These and other objects, features, and advantages of the present invention will become more apparent from the following detailed description of the preferred embodiment of the present invention when taken in conjunction with the accompanying drawings. It should be noted that the present invention is not limited to the embodiments but can freely be modified without departing from the scope and spirit thereof defined in the claims given later.

BEST MODE FOR CARRYING OUT THE INVENTION

Figure 1:
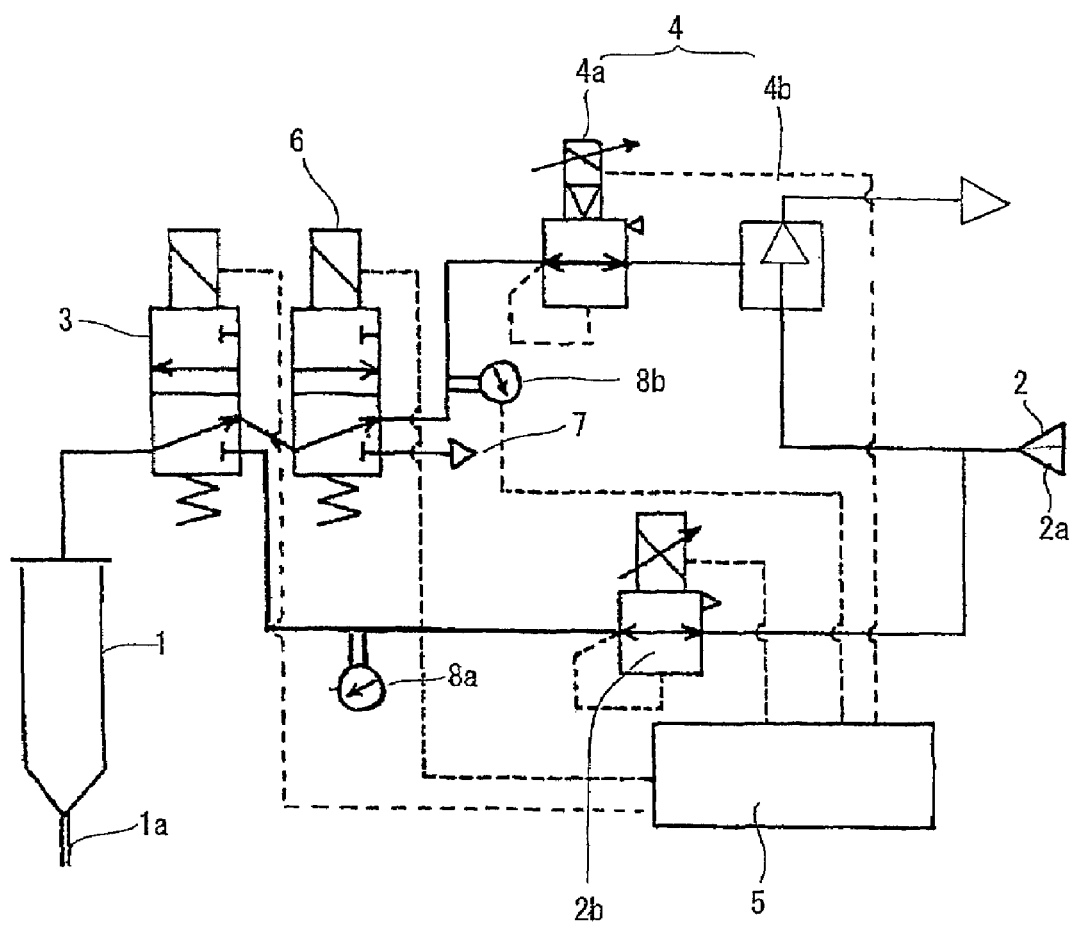
FIG. 1 is a circuit diagram of the liquid dispenser as an embodiment of the present invention.

Note that in FIG. 1, solid and broken lines indicate a pressure circuit and a signal circuit, respectively.

As shown, a syringe 1 to dispense a liquid filled therein is connected at one end thereof via a two-position delivery valve 3 to a pressurized gas source 2 including a compressor 2a and pressure regulator 2b provided downstream of the compressor 2a as shown and which supplies a liquid dispensing pressure. The syringe 1 has a nozzle 1a provided at the other end thereof. A negative pressure source 4 including a negative-pressure electropneumatic regulator 4a and an ejector 4b provided upstream of the electropneumatic regulator 4a as shown and which supplies a liquid retaining negative pressure into the syringe 1 is connected to the delivery valve 3 via a two-position valve 6 openable to the atmosphere.

Namely, the delivery valve 3 communicating with the syringe 1 is switched in position to communicate with either the pressuring gas source 2 or negative pressure source 4.

Owing to the above liquid dispenser configuration, upon the actuation of the delivery valve 3 in response to a signal from a controller 5, the liquid dispenser is controlled such that either the pressuring gas source 2 or two-position openable-to-atmosphere valve 6 is communicated with the syringe 1, while upon the actuation of the two-position openable-toatmosphere valve 6 in response to a signal from the controller 5, the liquid dispenser is controlled such that either the negative pressure source 4 or an open-to-atmosphere hole 7 is communicated with the delivery valve 3.

Therefore, when the delivery valve 3 is in a port position for communication with the openable-to-atmosphere valve 6 to syringe 1, the syringe 1 will communicate with either the negative pressure source 4 or open-to-atmosphere hole 7.

According to this embodiment, the liquid filled in the syringe 1 will be dispensed by shifting the delivery valve 3 from the port position as shown in response to the signal from the controller 5 and supplying a required pressure having been regulated by the pressure regulator 2b correspondingly to the residual amount of the liquid in the syringe 1 or the like into the syringe 1 for a required length of time.

When the liquid has been dispensed in a predetermined amount from the syringe 1, the controller 5 will reset the delivery valve 3 to the port position as shown, while shifting the openable-to-atmosphere valve 6 from the port position as shown to release the pressurized gas in the syringe into the atmosphere. Then, the openable-to-atmosphere valve 6 is reset to the port position as shown in an appropriate time, whereby an appropriate negative pressure supplied from the negative pressure source 4 will act on the liquid material in the syringe 1.

At this time, the pressure regulator 2b of the pressuring gas source 2 functions to reduce the pressurized gas from the compressor 2a to a required pressure level. The gas pressure downstream of the pressure regulator 2b can be measured by a pressure sensor 8a.

Also, the ejector 4b of the negative pressure source 4 functions to generate a negative pressure corresponding in magnitude to a flow rate of the gas passing therethrough, and the negative-pressure electropneumatic regulator 4a functions to regulate the negative pressure generated by the ejector 4b to a required level. The negative pressure downstream of the negative-pressure electropneumatic regulator 4a can be measured by a pressure sensor 8b.

Note that during wait for a dispensing job, the delivery valve 3 and openable-to-atmosphere valve 6 are in such port position that the syringe 1 and negative pressure source 4 are in communication with each other.

And the pressure downstream of the negative-pressure electropneumatic regulator 4a is measured by the pressure sensor 8b.

The pressure detected by the pressure sensor 8b is transmitted to the controller 5 in which it will be determined to have a desirable pressure level or not. The controller 5 will control the negative-pressure electropneumatic regulator 4a as necessary for the negative pressure detected by the pressure sensor 8b to have a desirable pressure level.

Industrial Applicability

As having been described in the foregoing, the present invention provides a dispenser capable of dispensing a paste- or cream-state electronic material, adhesive and other middle- or high-viscosity liquid material, liquid material whose viscosity varies with time, low-viscosity liquid material or the like accurately even right after it is turned on. The liquid dispenser is effectively utilizable especially in manufacture of semiconductors such as LSI, etc.

The invention claimed is:

1. A liquid dispenser for dispensing a predetermined amount of a liquid from a reservoir, including a negative pressure system to supply a negative pressure which acts on the liquid in the reservoir while no liquid is being dispensed, the negative pressure system comprising:

an ejector communicating with an air compressor;

an electropneumatic regulator provided downstream of the ejector, communicating with the ejector to regulate the negative pressure inside the reservoir to a desired negative pressure level;

a pressure sensor provided between the electropneumatic regulator and the reservoir; and a control means for controlling the electropneumatic regulator configured to be responsive to a signal from the pressure sensor to regulate the negative pressure inside the reservoir to the desired negative pressure level;

the liquid dispenser further comprising:

a pressure regulator branched from the ejector and communicating with the compressor, said regulator configured to reduce a pressure of pressurized gas from the compressor to a pre-determined pressure level, said pressure regulator further configured to provide a pressure to discharge the liquid from the reservoir; and a delivery valve connecting the electropneumatic regulator, the pressure regulator, and the reservoir with one another, wherein the delivery valve is configured to respond to the signal from the pressure sensor such that the reservoir communicates with at least one of the negative pressure system and the pressure regulator.

2. A liquid dispenser for dispensing a predetermined amount of a liquid from a reservoir, comprising a negative pressure system to supply a negative pressure which acts on the liquid in the reservoir while no liquid is being dispensed, the negative pressure system comprising:

an ejector communicating with an air compressor;

an electropneumatic regulator communicating with the ejector to regulate the negative pressure inside the reservoir to a desired negative pressure level;

a pressure sensor provided between the electropneumatic regulator and the reservoir; and a controller configured to control the electropneumatic regulator and configured to be responsive to a signal from the pressure sensor to regulate the negative pressure inside the reservoir to the desired negative pressure level;

the liquid dispenser further comprising:

a pressure regulator branched from the ejector and communicating with the compressor, said regulator configured to reduce a pressure of pressurized gas from the compressor to a pre-determined pressure level, said pressure regulator further configured to provide a pressure to discharge the liquid from the reservoir; and a delivery valve connecting the electropneumatic regulator, the pressure regulator, and the reservoir with one another, wherein the delivery valve is configured to respond to the signal from the pressure sensor such that the reservoir communicates with at least one of the negative pressure system and the pressure regulator.

3. The liquid dispenser according to claim 1, wherein the pressure sensor is provided between the electropneumatic regulator and the delivery valve, and the delivery valve is responsive to the signal from the pressure sensor such that the reservoir communicates with at least one of the negative pressure system, the pressure regulator, and an open-to-atmosphere aperture.

4. The liquid dispenser according to claim 2, wherein the pressure sensor is provided between the electropneumatic regulator and the delivery valve, and the delivery valve is responsive to the signal from the pressure sensor such that the reservoir communicates with at least one of the negative pressure system, the pressure regulator, and an open-to-atmosphere aperture.

5. A liquid dispenser for dispensing a predetermined amount of a liquid from a reservoir, including a negative pressure system to supply a negative pressure which acts on the liquid in the reservoir while no liquid is being dispensed, the negative pressure system comprising:

a negative pressure source;

an electropneumatic regulator communicating with the negative pressure source to regulate the negative pressure inside the reservoir to a desired negative pressure level;

a pressure sensor provided between the electropneumatic regulator and the reservoir;

a two-position valve connecting the electropneumatic regulator to the reservoir, wherein the two-position valve has an open-to-atmosphere aperture configured to release pressurized gas from the reservoir; and a controller configured to control the electropneumatic regulator and configured to be responsive to a signal from the pressure sensor to regulate the negative pressure inside the reservoir to the desired negative pressure level.

* * * * *